UNITED STATES PATENT OFFICE.

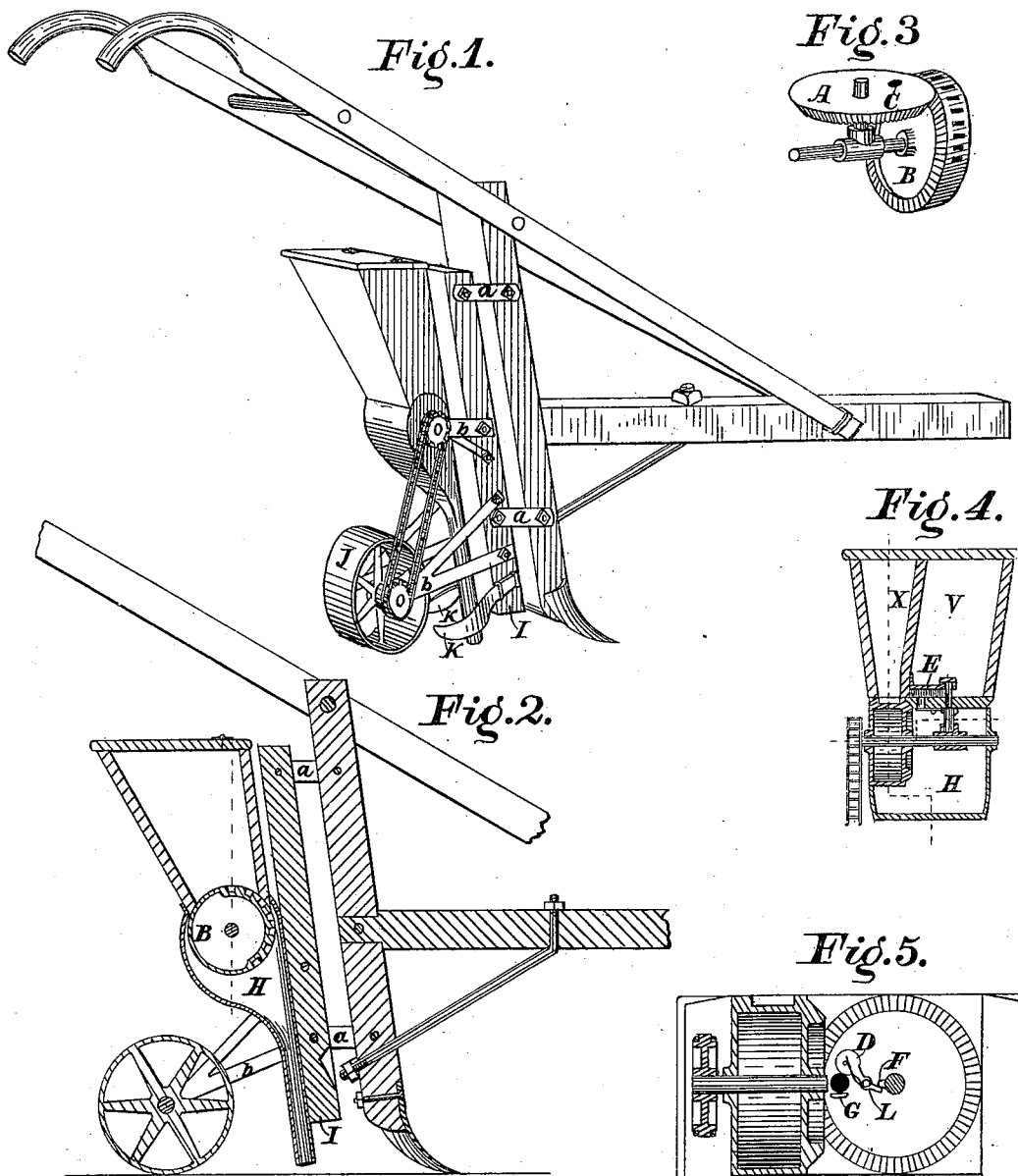

JOHN W. JONES, OF GREENFIELD, INDIANA.

COMBINED SEED-PLANTER AND FERTILIZER-DISTRIBUTER.

SPECIFICATION forming part of Letters Patent No. 275,919, dated April 17, 1883.

Application filed January 4, 1883. (No model.)

*To all whom it may concern:*

Be it known that I, JOHN W. JONES, a citizen of the United States, residing at Greenfield, county of Hancock, State of Indiana, have invented a new and Improved Combined Seed-Planter and Fertilizer-Distributer, of which the following is a specification.

My invention relates to improved method of drilling corn and sowing a fertilizing substance therewith at the same time. I attain this in my invention by the machine hereinafter described.

My machine is so constructed as to be separate and distinct from any plow, but to be attached thereto behind the stock thereof while in use.

The objects aforesaid are secured by simple machinery, the mechanism of which is illustrated in the accompanying drawings, to wit:

Figure 1 represents the machine as complete attached to an ordinary "shovel-plow" used in furrowing out the ground for planting corn. Fig. 2 shows a vertical side sectional view of same, showing position of hopper above and funnel H below, and view of mortises in wheel B, all as hereinafter set out. Fig. 3 shows the method by which I secure the drilling of the corn and the sowing of fertilizer by means of two wheels—one revolving horizontally, the other vertically, the latter wheel so arranged as to revolve with an axle, and thereby turn the former wheel by means of cogs so arranged upon each wheel as to fit in each other in a miter. Through the wheel A in this figure a hole is made, into which the grains of corn fall and drop out, as hereinafter explained. On the surface of wheel B is arranged one or more mortised grooves that receive the fertilizer from a hopper above as said wheel revolves. Fig. 4 is a front view of the wheels set out in Fig. 3 as they are set in between a partitioned hopper above and a funnel below. There also appears in this figure, at E, a "brush," which is set in the bottom of the side of hopper at V, which bottom is wheel A in Fig. 3. Fig. 5 shows a bottom view of the machinery set out in Figs. 3 and 4. In this there appears on the bottom of wheel A a slide or spring valve, D, which slide revolves on a pin at L, the purpose of which slide is to retain the corn in the hopper above until wheel A in its revolution is brought over the funnel beneath and the hole C therein is brought immediately under the brush E, above mentioned. When in this position the "slide" is thrown to one side, when the corn is permitted to escape into funnel aforesaid and passes thence to ground. In left of this figure appears sectional view of wheel B, which is used in fertilizing, and to extreme left appears manner of fitting cog-wheel that turns all. The hopper is shown beyond all.

To more particularly explain I shall call attention to the various parts now by letters.

In Fig. 3 appear two wheels. These wheels are each the bottom of a partitioned hopper, one side of which is intended to hold any kind of pulverized fertilizer—such as bone-dust, plaster, &c.—the other to hold corn. This hopper is shown in Fig. 4 at X and V, respectively. The two wheels A and B in Fig. 3 have each cogs around near their edges, which fit in a mitered form, so that the turning of one turns the other. A hole is made through the center of wheel A. This wheel is dropped over and turns on a pin passing up through said center hole. There is also another hole in this wheel at C. This is to receive the corn which drops into it as wheel is turning round on said pin. The corn, when in said last hole C, is held therein by slide D below, which is attached to the under side of wheel A. It is shown in Fig. 5 at D. The corn is retained in said hole until said wheel A by turning brings said hole C under the brush or cut-off E, Fig. 4, at which point the slide is brought against a lug or shoulder, F, on the pin passing through wheel A, which shoulder causes the said slide to turn on the pin L, thus pulling back slide until the hole is exposed and the corn falls in funnel H, Fig. 2, below, after which the slide is released by said shoulder, and is then forced back over said hole by a spring which is coiled on pin L, and passes thence out, and the outer end of spring is then dropped behind a small pin in the expanded portion of slide D. (See Fig. 5.) When slide returns it is stopped against a shoulder on wheel A at G. It returns to this position before C passes from under brush E. Now, the sole purpose of the brush E is to prevent the corn from passing through the hole C in wheel A when the slide D is turned as above, permitting only such grains to drop into funnel H as have gotten in hole C. The brush E is fastened at one end on side of hopper, at the other on pin projecting through center of wheel A. The axle of wheel B passes through the casting which supports wheel A, and revolves therein. Wheel B is turned by means of cog-wheels and chain, (explained hereinafter;) but the cogs on B turn wheel A by means of the cogs above explained, on each of said wheels.

Now, in Fig. 2 may be seen a sectional side view of machine, showing the location of wheel B between the hopper above and a funnel, H, below. The mortises or cups may also be seen and the manner in which they receive the fertilizer from hopper V. As the wheel turns the fertilizer falls into funnel, and is thus conveyed to ground at same time as corn is. There may be one or more of these mortises, to either drop the fertilizer in one place or in a number of places. In fact, the manner of sowing same is controlled just as farmer and manufacturer agree. A front view of wheel B is seen in Fig. 4 under hopper X. Wheel B performs the double function of first sowing the fertilizer, second turning wheel A.

The fertilizer may be dispensed with and wheel A or the corn-drill alone used. In all cases where fertilizer is used the wheels are so fitted together as to drop the corn in center of fertilizer. The hopper is bottomless, save and except as said wheels A and B make the bottoms of each partition of hopper. (See Fig. 4.)

In Fig. 1 the machine appears complete and attached to stock of shovel-plow as when working. The whole is constructed upon a frame, I I, Figs. 1 and 2, and then attached to stock of plow by means of braces and bolts *a a* in said Figs. 1 and 2. It is thus removable from plow when not needed for use. Now, to this frame I, Fig. 1, are attached hopper-wheels, Fig. 3, and funnel H. At lower end of frame I are placed blades or coverers K K, one on each side thereof, both curving in. Back of these runs on the ground a wheel of sufficient width and diameter to secure its revolution. It is about four inches wide and eight inches in diameter. This wheel, like the wheels above, is firmly attached to frame I by braces *b b*, the axles of said wheels passing through the outer ends of said arms and revolving therein.

Upon the end of axle to wheel J, as well as upon the end of axle to wheel B, above and outside of said braces *b b*, are cog-wheels, stationary upon the ends of said axles. Over these cog-wheels runs an endless chain. Now, the whole weight of the machine rests upon wheel J, which first secures the turning of said wheel; second, it firmly presses the dirt after planting corn, &c.; third, it is not made a burden upon the plowman, except at turns. The weight is about twenty-five pounds. It is not attached close to the stock of plow, but is kept away from it two or more inches, and is permitted freely, by braces *a a*, to move up and down. Thus, if plow be suddenly lifted or thrown from the ground, the drill works right on. It is not intended to allow much lateral motion. Then when the plow starts the large wheel J is set in motion, the endless chain turns wheel B above, and this in turn revolves wheel A. As they turn one receives corn, the other fertilizer, which at regular intervals are dropped into the funnel H, which carries all off to the furrow. Then the two curved plow-points or coverers K K throw back the dirt and cover both corn and fertilizer. Then follows wheel J, which in turn presses the dirt firmly upon the same, leaving it in the best possible condition.

I regulate the distance between the hills of corn by varying the size of the cog-wheels on said axles. If they are both the same size and wheel J is seven inches in diameter, then it will drop about every twenty-one inches; but when one is larger than the other the distance is increased or diminished as the large wheel is placed on the upper or lower axle. The axles are same size; hence wheels are interchangeable.

What I claim, and desire to secure by Letters Patent, is—

1. In a seeding and fertilizing attachment for plows, the combination, with a double hopper having a single spout, of a horizontal wheel and a vertical fertilizing-wheel, said wheels being adapted to gear with each other, substantially as shown and described.

2. In a seed-planter and fertilizer-distributer, the horizontal seed-wheel A, in combination with the vertical fertilizing-wheel B, adapted to gear with each other, substantially as and for the purpose set forth.

3. The combination, with a horizontal seed-wheel having an aperture or seed-cup, of a vertical fertilizing-wheel having mortises or cups, and adapted to gear with each other, substantially as and for the purpose described.

4. The combination, with seed-wheel A, having seed-cup C, of the slide D, pivoted to the wheel, its retracting-spring, the lug F upon the shaft, and the brush or cut-off E, substantially as described.

5. In combination with horizontal shaft H', sleeve H", and vertical shaft H''', having lug F, of the seed-wheel A and pivoted spring-valve D, substantially as described.

6. The combination, with a plow or furrowing device and a frame pivoted thereto, of a seeding and fertilizing attachment consisting of a double hopper attached to the frame, a horizontal seed-wheel, a vertical fertilizing-wheel gearing therewith, a ground-wheel, and an endless driving-chain, substantially as described.

JOHN W. JONES.

Witnesses:
 ELMER T. SWOPE,
 ALBERT L. NEW.